(12) United States Patent
Chen (10) Patent No.: US 8,714,801 B2
(45) Date of Patent: May 6, 2014

(54) INPUT DEVICE WITH MULTIPLE LAYERS OF LUMINOUS PATTERNS

(75) Inventor: Chung-Yuan Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 220 days.

(21) Appl. No.: 13/328,676

(22) Filed: Dec. 16, 2011

(65) Prior Publication Data

US 2013/0077346 A1  Mar. 28, 2013

(30) Foreign Application Priority Data

Sep. 23, 2011  (TW) .............................. 100134456 A (51) Int. Cl.
*F21V 7/04* (2006.01)

(52) U.S. Cl.
USPC ........... 362/602; 362/607; 362/612; 362/613; 362/616; 362/619

(58) Field of Classification Search
USPC ................. 362/602, 603, 607, 608, 612–613, 362/615–620; 345/173
See application file for complete search history.

(56) References Cited

U.S. PATENT DOCUMENTS

| | | | |
|---|---|---|---|
| 7,382,360 B2 * | 6/2008 | Mackey et al. | 345/173 |
| 2006/0132458 A1 * | 6/2006 | Garfio et al. | 345/173 |
| 2010/0259485 A1 * | 10/2010 | Chuang | 345/173 |
| 2010/0290251 A1 * | 11/2010 | Wang et al. | 362/612 |

* cited by examiner

*Primary Examiner* — Thomas Sember (74) *Attorney, Agent, or Firm* — Kirton McConkie; Evan R. Witt (57) ABSTRACT

An input device with multiple layers of luminous patterns is provided. The input device includes an input interface, a first light-emitting element, a second light-emitting element, and a light guide plate. The light guide plate includes an upper light-guiding layer, a lower light-guiding layer, and a gap. The upper light-guiding layer and the lower light-guiding layer are separated from each other by the gap. The light guide plate has multiple layers of luminous patterns, which are selectively visible. Consequently, the overall thickness of the input device is reduced.

15 Claims, 5 Drawing Sheets

INPUT DEVICE WITH MULTIPLE LAYERS OF LUMINOUS PATTERNS

FIELD OF THE INVENTION

The present invention relates to an input device, and more particularly to an input device with multiple layers of luminous patterns.

BACKGROUND OF THE INVENTION

With increasing development of science and technology, various touch-sensitive input devices are introduced into the market. The touch-sensitive input device may be operated in two different input modes. In addition, the touch-sensitive input device has an illumination module. In a case that the illumination module is enabled, a preset pattern of the touch-sensitive input device is visible, and thus the touch-sensitive input device is operated in a first input mode. Whereas, in a case that the illumination module is disabled, the preset pattern is invisible, and thus the touch-sensitive input device is operated in a second input mode. That is, the user may realize the current input mode of the touch-sensitive input device by judging whether the preset pattern is visible or not. Consequently, the touch-sensitive input device is operated in the input mode to input signals. For example, if the illumination module is disabled, the overall outward appearance of the touch-sensitive input device looks black, and the input mode is a preset mouse cursor control mode. Under this circumstance, the user may perform a mouse-moving action or a clicking action by operating the overall black touch-sensitive input device. Whereas, if the illumination module is enabled, the touch-sensitive input device is displayed as a luminous keyboard, and the input mode is a preset keyboard control mode. Under this circumstance, the user may input characters and symbols via the touch-sensitive input device according to the visible luminous pattern. For avoiding the user's confusion, the luminous touch-sensitive input device should be specially designed to make the preset pattern invisible when the illumination module is disabled and make the preset pattern visible when illumination module is enabled.

Figure 1:
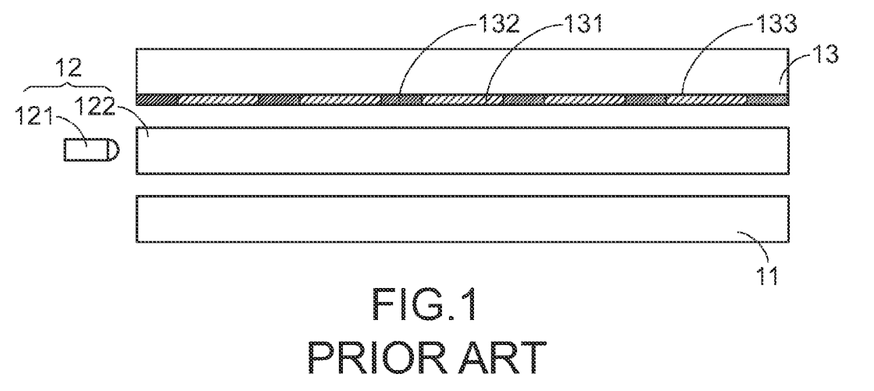
FIG. 1 is a schematic side view illustrating a conventional luminous input device.

FIG. 1 is a schematic side view illustrating a conventional luminous input device. The conventional luminous input device 1 comprises an input interface 11, an illumination module 12 and a Mylar plate 13. From bottom to top, the input interface 11, the illumination module 12 and the Mylar plate 13 are sequentially shown. In a case that the input interface 11 is triggered by a user's finger or a pen, a corresponding touching signal is generated. The illumination module 12 comprises a light-emitting element 121 and a light guide plate 122. The light-emitting element 121 is used for emitting a light beam (not shown). The light guide plate 122 is located beside the light-emitting element 121 for guiding the light beam to the input interface 11. For example, the light-emitting element 121 is a light emitting diode (LED). The Mylar plate 13 has a plurality of luminous patterns 131. These luminous patterns 131 are disposed on a bottom surface 133 of the Mylar plate 13. In addition, the luminous patterns 131 are formed by printing a black light-shading ink having a light-shading percentage of about 98%. The regions of the bottom surface 133 of the Mylar plate 13 excluding the luminous patterns 131 are light-shading layers 132. These light-shading layers 132 are formed by printing a black opaque ink. Consequently, the light beam is only permitted to be transmitted through the regions of the bottom surface 133 of the Mylar plate 13 that are printed with the luminous patterns 131, and the light beam fails to be transmitted through the light-shading layers 132.

In a case that the illumination module 12 of the luminous input device 1 is disabled, the weak ambient light beams from the surroundings may be directed into the luminous input device 1. Since the luminous patterns 131 have the light-shading percentage of about 98%, only 2% of the ambient light beams can be transmitted through the luminous patterns 131. Since the ambient light beams are too weak, the luminous patterns 131 of the Mylar plate 13 fail to be recognized by naked eyes. In other words, the luminous patterns 131 are invisible. Whereas, when the illumination module 12 of the luminous input device 1 is enabled, a great portion of the light beam is directed into the luminous input device 1. Although only 2% of the light beam from the illumination module 12 can be transmitted through the Mylar plate 13, the light intensity is sufficient to be recognized by the human's eyes. Under this circumstance, the luminous patterns 131 are visible, and thus the user can recognize the touched position corresponding to the luminous patterns 131 of the luminous input device 1. The configurations and functions of the conventional touch-sensitive input device have been illustrated as above.

Figure 2:
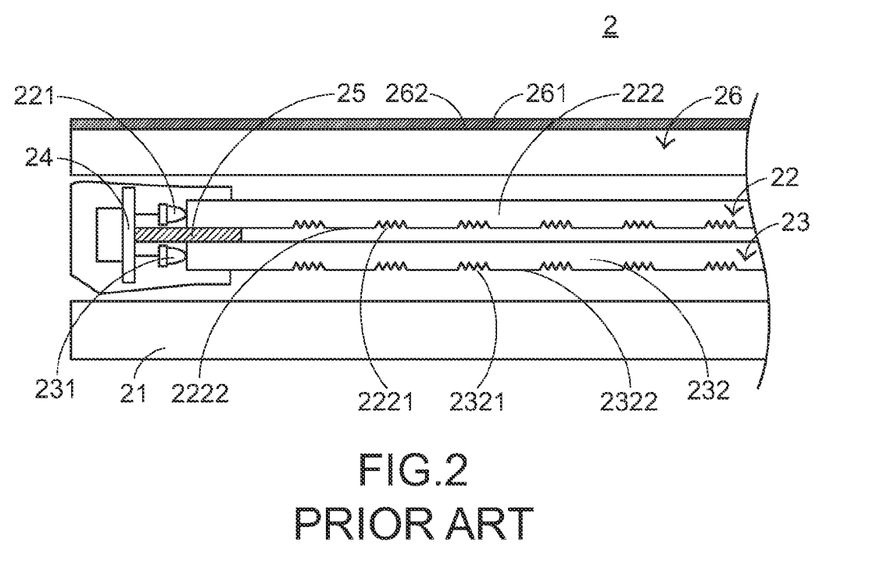
FIG. 2 is a schematic side view illustrating an input device with multiple layers of luminous patterns according to the prior art.

With increasing development of science and technology, the functions of the touch-sensitive input device become more diverse. Nowadays, an input device with multiple layers of luminous patterns is introduced into the market. FIG. 2 is a schematic side view illustrating an input device with multiple layers of luminous patterns according to the prior art. As shown in FIG. 2, the input device 2 comprises an input interface 21, a first illumination module 22, a second illumination module 23, a circuit board 24, a light-shading plate 25 and a protective layer 26. From bottom to top, the input interface 21, the second illumination module 23, the light-shading plate 25, the first illumination module 22 and the protective layer 26 are sequentially shown.

In a case that the input interface 21 is triggered, a corresponding touching signal is generated. The first illumination module 22 comprises a first light-emitting element 221 and a first light guide plate 222. The first light-emitting element 221 is used for emitting a first light beam (not shown). The first light guide plate 222 is located beside the first light-emitting element 221 for guiding the first light beam to the input interface 21. In addition, the first light guide plate 222 has a plurality of first luminous patterns 2221. The first luminous patterns 2221 are disposed on a bottom surface 2222 of the first light guide plate 222. That is, when the first light beam is emitted by the first light-emitting element 221, the first luminous patterns 2221 of the first light guide plate 222 are illuminated and become visible. Moreover, the first luminous patterns 2221 are collectively defined as an alphanumeric keyboard interface for inputting letters and symbols.

The second illumination module 23 comprises a second light-emitting element 231 and a second light guide plate 232. The second light-emitting element 231 is used for emitting a second light beam (not shown). The second light guide plate 232 is located beside the second light-emitting element 231 for guiding the second light beam to the input interface 21. In addition, the second light guide plate 232 has a plurality of second luminous patterns 2321. The second luminous patterns 2321 are disposed on a bottom surface 2322 of the second light guide plate 232. That is, when the second light beam is emitted by the second light-emitting element 231, the second luminous patterns 2321 of the second light guide plate 232 are illuminated and become visible. Moreover, the second luminous patterns 2321 are collectively defined as a Chinese keyboard interface for inputting Chinese characters.

In addition, both of the light-emitting element 221 and the light-emitting element 231 are light emitting diodes.

Please refer to FIG. 2 again. The protective layer 26 is disposed over the first illumination module 22. The protective layer 26 is used for protecting the first illumination module 22 from being collided or rubbed by the external force. The protective layer 26 has a light-shading layer 261. The light-shading layer 261 is disposed on a top surface 262 of the protective layer 26 for shading a great portion of the first light beam, a great portion of the second light beam or a great portion of the external light beams. The light-shading layer 261 is formed by printing a light-shading ink on the top surface 262 of the protective layer 26. In addition, the light-shading layer 261 has a preset light-shading percentage of about 98%. The circuit board 24 is located beside the first illumination module 22 and the second illumination module 23. In addition, the circuit board 24 is perpendicular to the light-shading plate 25. The first light-emitting element 221 and the second light-emitting element 231 are disposed on the circuit board 24. As shown in FIG. 2, both of the first light-emitting element 221 and the second light-emitting element 231 are front-view light emitting diodes.

The light-shading plate 25 is arranged between the first light guide plate 222 and the second light guide plate 232 for shading the first light beam that is emitted by the first light-emitting element 221. Since the first light beam is not directed to the second light guide plate 232, the second luminous patterns 2321 of the second illumination module 23 on the second light guide plate 232 are not influenced by the first light beam. Similarly, the second light beam from the second light-emitting element 231 is also shaded by the light-shading plate 25. Since the second light beam is not directed to the first light guide plate 222, the first luminous patterns 2221 of the first illumination module 22 on the first light guide plate 222 are not influenced by the second light beam.

In a case that the first illumination module 22 and the second illumination module 23 of the input device 2 are disabled, the weak ambient light beams from the surroundings may be directed into the luminous input device 2. Since the light-shading layer 261 has the preset light-shading percentage of about 98%, only 2% of the ambient light beams can be transmitted through the light-shading layer 261. Since the ambient light beams are too weak, the ambient light beams fail to be recognized by naked eyes. Consequently, the first luminous patterns 2221 and the second luminous patterns 2321 on the first light guide plate 222 and the second light guide plate 232 are invisible. That is, these luminous patterns are not viewed by the user. Whereas, when the first illumination module 22 of the input device 2 is enabled, a great portion of first light beam is directed into the input device 2. Although only 2% of the first light beam from the first illumination module 22 can be transmitted through the light-shading layer 261, the light intensity is sufficient to be recognized by the human's eyes. Under this circumstance, the first luminous patterns 2221 are visible, and thus the user can recognize the touched position corresponding to the first luminous patterns 2221 of the input device 2. The operations of enabling the second illumination module 23 of the input device 2 of this embodiment are similar to those of the first illumination module 22, and are not redundantly described herein.

From the above discussions, the input device 2 can provide two types of luminous patterns. By judging whether the first luminous patterns 2221 or the second luminous patterns 2321 are visible, the user may realize the current keyboard mode of the input device 2. However, the conventional input device 2 still has some drawbacks. For example, the first luminous patterns 2221 and the second luminous patterns 2321 are disposed on the first light guide plate 222 and the second light guide plate 232, respectively. Since the first light guide plate 222 and the second light guide plate 232 are arranged in a stacked form, the overall thickness of the input device 2 is too large.

SUMMARY OF THE INVENTION

The present invention relates to a slim input device with multiple layers of luminous patterns.

In accordance with an aspect of the present invention, there is provided an input device with multiple layers of luminous patterns. The input device includes an input interface, a first light-emitting element, a second light-emitting element, and a light guide plate. When the input interface is triggered, a touching signal is generated. The first light-emitting element is used for emitting a first light beam. The second light-emitting element is used for emitting a second light beam. The light guide plate is disposed over or under the input interface, and arranged between the first light-emitting element and the second light-emitting element. The light guide plate includes a plurality of first luminous patterns, a plurality of second luminous patterns and a gap between the first luminous patterns and the second luminous patterns. The first light beam and the second light beam are respectively guided by the light guide plate, so that the first luminous patterns or the second luminous patterns are selectively visible.

In an embodiment, the light guide plate further includes an upper light-guiding layer, a lower light-guiding layer and a gap. The gap is arranged between the upper light-guiding layer and the lower light-guiding layer. The first luminous patterns are disposed on a first outer surface or a first inner surface of the upper light-guiding layer. The second luminous patterns are disposed on a second outer surface or a second inner surface of the lower light-guiding layer.

In an embodiment, the first light beam is guided by the upper light-guiding layer of the light guide plate and directed to the first luminous patterns, so that the first luminous patterns are shown on the light guide plate. The second light beam is guided by the lower light-guiding layer of the light guide plate and directed to the second luminous patterns, so that the second luminous patterns are shown on the light guide plate. Moreover, the first luminous patterns and the second luminous patterns are composed of a plurality of closely packed light-guiding microstructures.

In an embodiment, the input device includes a first light-shading structure and a second light-shading structure. The first light-shading structure is disposed on a sidewall of the lower light-guiding layer and located near the first light-emitting element for blocking the first light beam from entering the lower light-guiding layer. The second light-shading structure is disposed on a sidewall of the upper light-guiding layer and located near the second light-emitting element for blocking the second light beam from entering the upper light-guiding layer.

In an embodiment, the first light-shading structure is a plastic sheet, a sponge structure or a light-shading plate, or the first light-shading structure is formed by painting, spraying, printing or bonding a light-shading material on the sidewall of the lower light-guiding layer. Moreover, the second light-shading structure is a plastic sheet, a sponge structure or a light-shading plate, or the second light-shading structure is formed by painting, spraying, printing or bonding a light-shading material on the sidewall of the upper light-guiding layer.

In an embodiment, the input device further includes a protective layer, which is disposed over the light guide plate for protecting the light guide plate. The protective layer includes a light-transmissible zone and a light-shading zone. The light-shading zone is located around the light-transmissible zone for shading the first light beam or the second light beam. In response to the first light beam or the second light beam, the first luminous patterns or the second luminous patterns are visible through the light-transmissible zone. The light-transmissible zone has a preset light-shading percentage, wherein if the first light-emitting element or the second light-emitting element is disabled and the first light beam or the second light beam is not generated, the first luminous patterns or the second luminous pattern are invisible by the first light-emitting element or the second light-emitting element according to the preset light-shading percentage. If the first light beam or the second light beam is not generated, an external light beam from surroundings of the input device is blocked by the light-shading zone having the preset light-shading percentage, so that the first luminous patterns or the second luminous patterns are invisible. Moreover, the preset light-shading percentage is in a range between 75% and 80%.

In an embodiment, the input device includes a first circuit board and a second circuit board. The first circuit board is disposed over or under the input interface and located at a first side of the input surface, wherein the first light-emitting element is disposed on the first circuit board. The second circuit board is disposed over or under the input interface and located at a second side of the input surface, wherein the second light-emitting element is disposed on the second circuit board. Preferably, the first light-emitting element and the second light-emitting element are both side-view light emitting diodes.

In an embodiment, the first light-emitting element is located at a first side of the first circuit board, and a second side of the first circuit board is interposed between the light guide plate and the input interface. The second light-emitting element is located at a first side of the second circuit board, and a second side of the second circuit board is interposed between the light guide plate and the input interface.

In an embodiment, the first circuit board includes a first conductive wire. The first conductive wire is disposed on a top surface of the first circuit board. The first conductive wire is extended from the second side of the first circuit board to the first side of the first circuit board and connected to the first light-emitting element. The second circuit board includes a second conductive wire. The second conductive wire is disposed on a top surface of the second circuit board. The second conductive wire is extended from the second side of the second circuit board to the first side of the second circuit board and connected to the second light-emitting element.

In an embodiment, the input interface is disposed under the light guide plate, and the input interface is an opaque PCB-based capacitive touch sensor.

In an embodiment, the input interface is disposed over the light guide plate, and the input interface is a light-transmissible surface capacitive touch sensor, a light-transmissible inner capacitive touch sensor or a projected capacitive touch sensor.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 3:
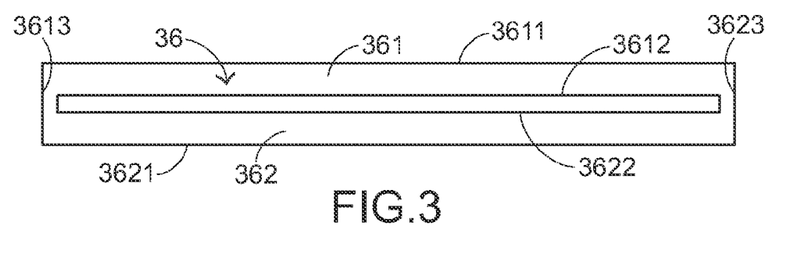
FIG. 3 is a schematic side view illustrating a light guide plate of an input device with multiple layers of luminous patterns according to a first embodiment of the present invention.

For obviating the drawbacks encountered from the prior art, the present invention provides an input device with multiple layers of luminous patterns. FIG. 3 is a schematic side view illustrating a light guide plate of an input device with multiple layers of luminous patterns according to a first embodiment of the present invention. In FIG. 3, a light guide plate 36 of an input device 3 is shown. The light guide plate 36 comprises an upper light-guiding layer 361, a lower light-guiding layer 362, a gap 363, a plurality of first luminous patterns 364 (see FIG. 4), and a plurality of second luminous patterns 365 (see FIG. 4). The gap 363 is arranged between the upper light-guiding layer 361 and the lower light-guiding layer 362, so that the upper light-guiding layer 361 and the lower light-guiding layer 362 are separated from each other by the gap 363. The upper light-guiding layer 361 and the lower light-guiding layer 362 are integrally formed with each other. In this embodiment, the gap 363 is an air layer. From the side-view perspective, the light guide plate 36 has a rectangular hollow cross-sectional structure. Moreover, the upper light-guiding layer 361 of the light guide plate 36 comprises a first outer surface 3611, a first inner surface 3612 and a sidewall 3613. The lower light-guiding layer 362 of the light guide plate 36 comprises a second outer surface 3621, a second inner surface 3622 and a sidewall 3623.

Figure 4:
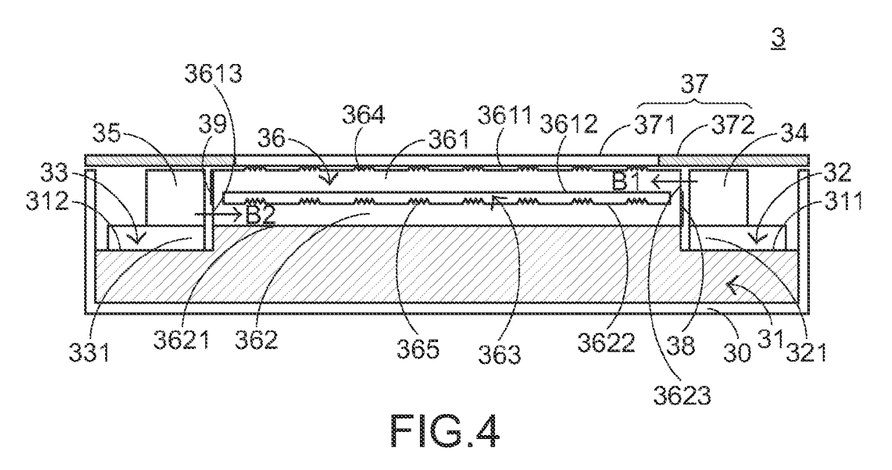
FIG. 4 is a schematic side view illustrating the input device with multiple layers of luminous patterns according to the first embodiment of the present invention.
Figure 5:
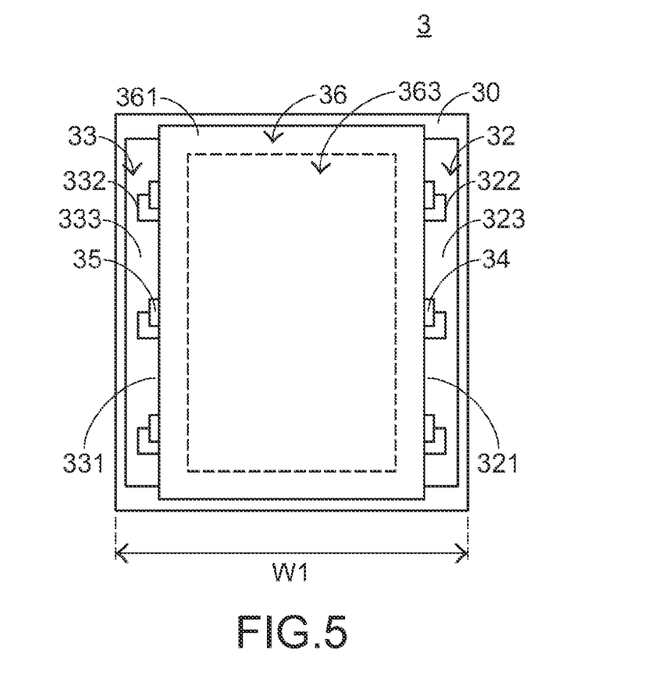
FIG. 5 is a schematic partial top view illustrating the input device with multiple layers of luminous patterns according to the first embodiment of the present invention.

Hereinafter, the whole structure of the input device of the present invention will be illustrated with reference to FIGS. 4 and 5. FIG. 4 is a schematic side view illustrating the input device with multiple layers of luminous patterns according to the first embodiment of the present invention. FIG. 5 is a schematic partial top view illustrating the input device with multiple layers of luminous patterns according to the first embodiment of the present invention. In addition to the light guide plate 36, the input device 3 further comprises a base plate 30, an input interface 31, a first circuit board 32, a second circuit board 33, a first light-emitting element 34, a second light-emitting element 35, a protective layer 37, a first light-shading structure 38, and a second light-shading structure 39. The input interface 31 is disposed on the base plate 30. In a case that the input interface 31 is triggered by a user's finger or a pen, a corresponding touching signal is generated. In this embodiment, the input interface 31 is an opaque PCB-based capacitive touch sensor. The first circuit board 32 is disposed on the input interface 31 and located at a first side 311 of the input interface 31. The second circuit board 33 is disposed on the input interface 31 and located at a second side 312 of the input interface 31. The first light-emitting element 34 is located at a first side 321 of the first circuit board 32 for emitting a first light beam B1. The second light-emitting element 35 is located at a first side 331 of the second circuit board 33 for emitting a second light beam B2. In this embodiment, the first side 321 of the first circuit board 32 is an inner side of the first circuit board 32, and the first side 331 of the second circuit board 33 is an inner side of the second circuit board 33. Moreover, both of the first light-emitting element 34 and the second light-emitting element 35 are side-view light emitting diodes.

The light guide plate 36 is disposed on the input interface 31, and arranged between the first light-emitting element 34 and the second light-emitting element 35. The first luminous patterns 364 are disposed on the first outer surface 3611 or the first inner surface 3612 of the upper light-guiding layer 361. The second luminous patterns 365 are disposed on the second outer surface 3621 or the second inner surface 3622 of the lower light-guiding layer 362. In this embodiment as shown in FIG. 4, the first luminous patterns 364 are disposed on the first outer surface 3611 of the upper light-guiding layer 361, and the second luminous patterns 365 are disposed on the second inner surface 3622 of the lower light-guiding layer 362.

In this embodiment, the first luminous patterns 364 and the second luminous patterns 365 are closely packed light-guiding microstructures. The light-guiding microstructures are for example closely packed microstructures (e.g. micro lenses or V-shaped notches) or closely packed dots. The light-guiding microstructures that constitute the luminous patterns may change the incidence angles of a portion of the light beam within the light guide plate 36. Since the uses of the light-guiding microstructures can destroy the total internal reflection path, the light beam is refracted and transmitted through the light guide plate 36. That is, the light beam is transmitted through the regions over the light-guiding microstructures, so that the first luminous patterns 364 or the second luminous patterns 365 are visible.

Please refer to FIG. 4 again. The first light-shading structure 38 is disposed on the sidewall 3623 of the lower light-guiding layer 362 and located near the first light-emitting element 34 for blocking the first light beam B1 from entering the lower light-guiding layer 362. The second light-shading structure 39 is disposed on the sidewall 3613 of the upper light-guiding layer 361 and located near the second light-emitting element 35 for blocking the second light beam B2 from entering the upper light-guiding layer 361. In this embodiment, the first light-shading structure 38 is formed by painting, spraying, printing or bonding a light-shading material on the sidewall 3623 of the lower light-guiding layer 362. Alternatively, the first light-shading structure 38 is a plastic sheet, a sponge structure or a light-shading plate. In this embodiment, the second light-shading structure 39 is formed by painting, spraying, printing or bonding a light-shading material on the sidewall 3613 of the upper light-guiding layer 361. Alternatively, the second light-shading structure 39 is a plastic sheet, a sponge structure or a light-shading plate.

Please refer to FIG. 4 again. The protective layer 37 is located over the light guide plate 36 for protecting the input interface 31. In addition, the protective layer 37 comprises a light-transmissible zone 371 and a light-shading zone 372. The light-shading zone 372 is located around the light-transmissible zone 371. The light-shading zone 372 is used for shading the first light beam B1, the second light beam B2 or other external light beams (not shown). In response to the first light beam B1 or the second light beam B2, the first luminous patterns 364 or the second luminous patterns 365 are visible through the light-transmissible zone 371. Moreover, the light-transmissible zone 351 has a preset light-shading percentage. For example, the preset light-shading percentage is in the range between 75% and 80%.

Please refer to FIG. 5 again. The first circuit board 32 comprises a first conductive wire 322. The first conductive wire 322 is disposed on a top surface 323 of the first circuit board 32. In addition, the first conductive wire 322 is extended from the first side 321 of the first circuit board 32 and connected to the first light-emitting element 34. The second circuit board 33 comprises a second conductive wire 332. The second conductive wire 332 is disposed on a top surface 333 of the second circuit board 33. In addition, the second conductive wire 332 is extended from the first side 333 of the second circuit board 33 and connected to the second light-emitting element 35.

In a case that the first light-emitting element 34 and the second light-emitting element 35 of the input device 3 are disabled and the first light beam B1 and the second light beam B2 are not generated, the first luminous patterns 364 and the second luminous patterns 365 are invisible according to the preset light-shading percentage of the light-transmissible zone 371. The reason will be illustrated as follows. If no light beams are emitted by the first light-emitting element 34 and the second light-emitting element 35, only the external light beams from the surroundings are possibly incident into the light-transmissible zone 371 of the protective layer 37. Since the preset light-shading percentage of the light-transmissible zone 371 is in the range between 75% and 80%, about 75% and 80% of the light beam incident into the light-transmissible zone 371 is absorbed by the light-transmissible zone 371. That is, the rest (i.e. 20~25%) of the light beam is directed to the light guide plate 36. After the rest (i.e. 20~25%) of the light beam is hit by the light-guiding microstructures of the light guide plate 36 (i.e. the first luminous patterns 364 or the second luminous patterns 365), about a half of the light beam is refracted and continuously directed toward the region under the light guide plate 36 because the incidence angles of the light beam projected onto the light-guiding microstructures are different. That is, only about 10% of the light beam is reflected by the light-guiding microstructures and directed toward the light-transmissible zone 371. After the light beam is reflected to the light-transmissible zone 371, a portion of the light beam is absorbed by the light-transmissible zone 371 again. Meanwhile, only about 2% of the light beam is transmitted through the light-transmissible zone 371. Since the light beam intensity is too weak, the first luminous patterns 364 and the second luminous patterns 365 are invisible. Under this circumstance, the first luminous patterns 364 and the second luminous patterns 365 fail to be viewed by the user.

After the first light-emitting element 34 is enabled to emit the first light beam B1, a great portion of the first light beam B1 is laterally incident into the light guide plate 36. In addition, another portion of the first light beam B1 is blocked by the first light-shading structure 38, which is formed on the sidewall 3623 of the lower light-guiding layer 362 of the light guide plate 36. Consequently, the first light beam B1 fails to be introduced into the lower light-guiding layer 362, but is only permitted to be introduced into the upper light-guiding layer 361. When the first light beam B1 is guided by the upper light-guiding layer 361 and directed to the first luminous patterns 364 that are constructed by the light-guiding microstructures, the first light beam B1 is directed toward the region over the upper light-guiding layer 361 because the total internal reflection path is destroyed by the light-guiding microstructures. That is, the first light beam B1 leaves the light guide plate 36. During the first light beam B1 is transmitted through the light guide plate 36 and directed to the light-transmissible zone 371 of the protective zone 371, about 75% and 80% of the first light beam B1 is absorbed by the light-transmissible zone 371. That is, about 20~25% of the first light beam B1 is allowed to be transmitted through the light-transmissible zone 371, so that the first luminous patterns 364 are illuminated and can be viewed by the user (see FIG. 6).

After the second light-emitting element 35 is enabled to emit the second light beam B2, a great portion of the second light beam B2 is laterally incident into the light guide plate 36. In addition, another portion of the second light beam B2 is blocked by the second light-shading structure 39, which is formed on the sidewall 3613 of the upper light-guiding layer 361 of the light guide plate 36. Consequently, the second light beam B2 fails to be introduced into the upper light-guiding layer 361, but is only permitted to be introduced into the lower light-guiding layer 362. When the second light beam B2 is guided by the lower light-guiding layer 362 and directed to the second luminous patterns 365 that are constructed by the light-guiding microstructures, the second light beam B2 is directed toward the region over the lower light-guiding layer 362 because the total internal reflection path is destroyed by the light-guiding microstructures. That is, the second light beam B2 leaves the lower light-guiding layer 362, enters the gaps 363 of the light guide plate 36, then passes through the upper light-guiding layer 361, and finally leaves the light guide plate 36. During the second light beam B2 is transmitted through the light guide plate 36 and directed to the light-transmissible zone 371 of the protective zone 371, about 75% and 80% of the second light beam B2 is absorbed by the light-transmissible zone 371. That is, about 20~25% of the second light beam B2 is allowed to be transmitted through the light-transmissible zone 371, so that the second luminous patterns 365 are illuminated and can be viewed by the user (see FIG. 7).

Figure 6:
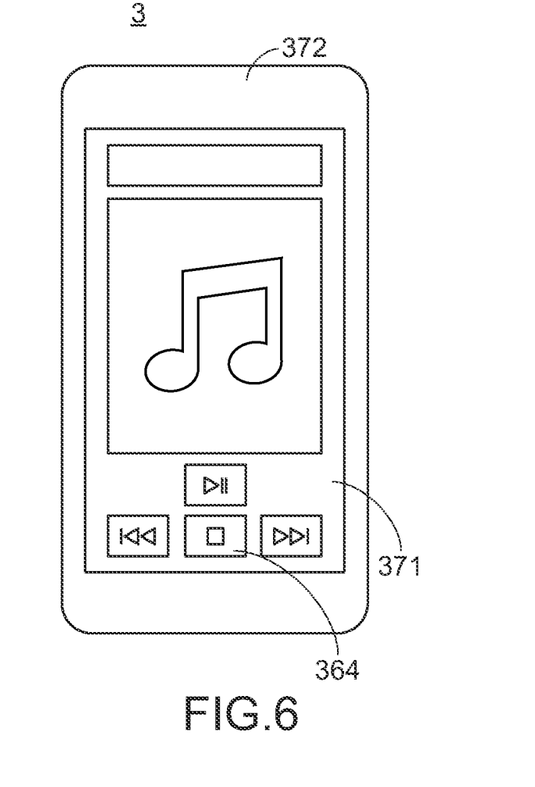
FIG. 6 is a schematic top view illustrating the first luminous patterns of the input device are illuminated to be viewed according to the first embodiment of the present invention.
Figure 7:
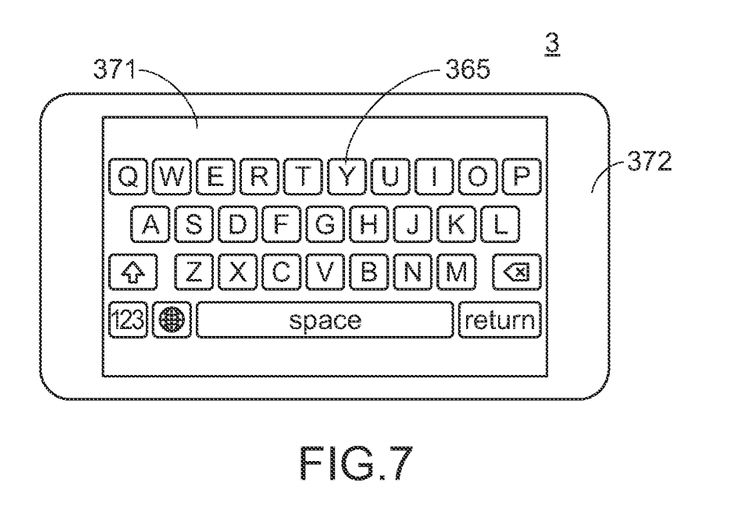
FIG. 7 is a schematic top view illustrating the second luminous patterns of the input device are illuminated to be viewed according to the first embodiment of the present invention.

As shown in FIGS. 6 and 7, the first luminous patterns 364 are collectively defined as a music playback interface for controlling playback of the music, and the second luminous patterns 365 are collectively defined as an alphanumeric keyboard interface for inputting letters and symbols.

Moreover, the light transmission medium within the gap 363 of the light guide plate 36 is air. Consequently, during the second light beam B2 is introduced into the gap 363 from the lower light-guiding layer 362 of the light guide plate 36, the second light beam B2 is refracted once because the light transmission medium is changed from the material of the light guide plate 36 to the air. Similarly, during the second light beam B is directed to the upper light-guiding layer 361 from the gap 363, the second light beam B2 is further refracted once because the light transmission medium is changed from the air to the material of the light guide plate 36. Since the second light beam B is retracted twice, the possibility of allowing the second light beam B to pass through the light-guiding microstructures of the first luminous patterns 364 will be minimized. In such way, only the second luminous patterns 365 are shown on the light guide plate 36, but the first luminous patterns 364 are invisible.

In the above embodiment, the light guide plate 36 of the input device 3 of the present invention is divided into the upper light-guiding layer 361 and the lower light-guiding layer 362 by a specified production process. In the input device 3 of the present invention, multiple layers of luminous patterns are disposed on a single light guide plate 36. Consequently, the overall thickness of the input device 3 will be reduced.

Figure 8:
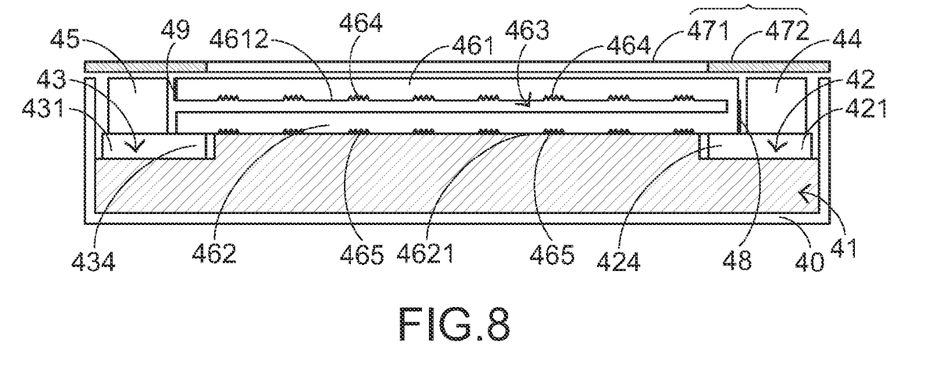
FIG. 8 is a schematic side view illustrating an input device with multiple layers of luminous patterns according to a second embodiment of the present invention.
Figure 9:
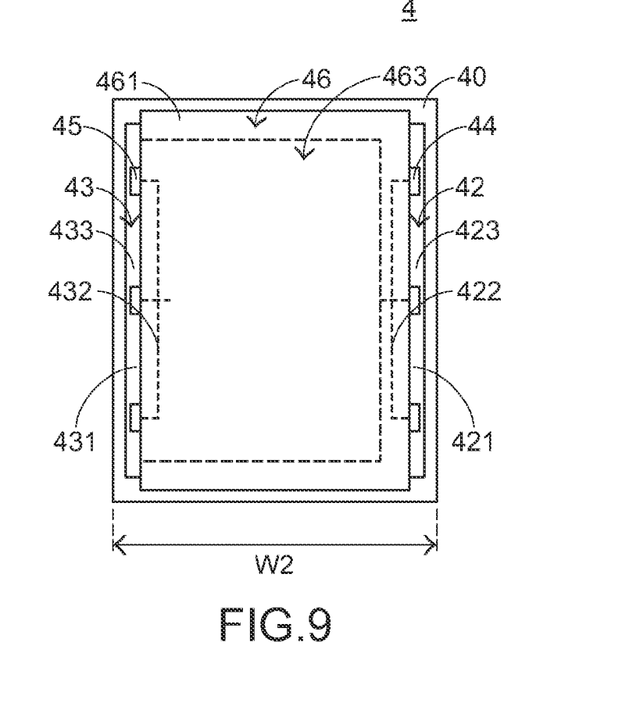
FIG. 9 is a schematic partial top view illustrating the input device with multiple layers of luminous patterns according to the second embodiment of the present invention.

The present invention further provides a second embodiment. FIG. 8 is a schematic side view illustrating an input device with multiple layers of luminous patterns according to a second embodiment of the present invention. FIG. 9 is a schematic partial top view illustrating the input device with multiple layers of luminous patterns according to the second embodiment of the present invention. As shown in FIGS. 8 and 9, the input device 4 comprises a base plate 40, an input interface 41, a first circuit board 42, a second circuit board 43, a first light-emitting element 44, a second light-emitting element 45, a light guide plate 46, a protective layer 47, a first light-shading structure 48, and a second light-shading structure 49. The light guide plate 46 comprises an upper light-guiding layer 461, a lower light-guiding layer 462, a gap 463, a plurality of first luminous patterns 464, and a plurality of second luminous patterns 465. The gap 463 is arranged between the upper light-guiding layer 461 and the lower light-guiding layer 462, so that the upper light-guiding layer 461 and the lower light-guiding layer 462 are separated from each other by the gap 463. The upper light-guiding layer 461 and the lower light-guiding layer 462 are integrally formed with each other. In addition, the protective layer 47 comprises a light-transmissible zone 471 and a light-shading zone 472.

Except for the following three items, the configurations and functions of the input device of the second embodiment are similar to those of the first embodiment, and are not redundantly described herein. Firstly, the first luminous patterns 464 are disposed on the first inner surface 4612 of the upper light-guiding layer 461, and the second luminous patterns 465 are disposed on the second outer surface 4621 of the lower light-guiding layer 462. Secondly, the upper light-guiding layer 461 and the lower light-guiding layer 462 at a first side of the light guide plate 46 are disconnected from each other. From the side-view perspective as shown in FIG. 8, the light guide plate 46 has a U-shaped cross-sectional structure.

Thirdly, the first light-emitting element 44 is located at a first side 421 of the first circuit board 42. A second side 424 of the first circuit board 42 is interposed between the light guide plate 46 and the input interface 41. The second light-emitting element 45 is located at a first side 431 of the second circuit board 43. Moreover, a second side 434 of the second circuit board 43 is interposed the region between the light guide plate 46 and the input interface 41. In addition, the first circuit board 42 comprises a first conductive wire 422. The first conductive wire 422 is disposed on a top surface 423 of the first circuit board 42. The first conductive wire 422 is extended from the second side 424 of the first circuit board 42 to the first side 421 of the first circuit board 42 and connected to the first light-emitting element 44. The second circuit board 43 comprises a second conductive wire 432. The second conductive wire 432 is disposed on a top surface 433 of the second circuit board 43. In addition, the second conductive wire 432 is extended from the second side 434 of the second circuit board 43 to the first side 431 of the second circuit board 43 and connected to the second light-emitting element 45. In this embodiment, the first side 421 of the first circuit board 42 is an outer side of the first circuit board 42, and the first side 431 of the second circuit board 43 is an outer side of the second circuit board 43. That is, since the first circuit board 42 and the second circuit board 43 are interposed between the light guide plate 46 and the input interface 41, the first circuit board 42 and the second circuit board 43 are movable toward the inner side.

Please refer to FIGS. 5 and 9. The width W1 of the input device 3 is larger than the width W2 of the input device 4. Consequently, the input device 4 of this embodiment is advantageous for miniaturization.

Figure 10:
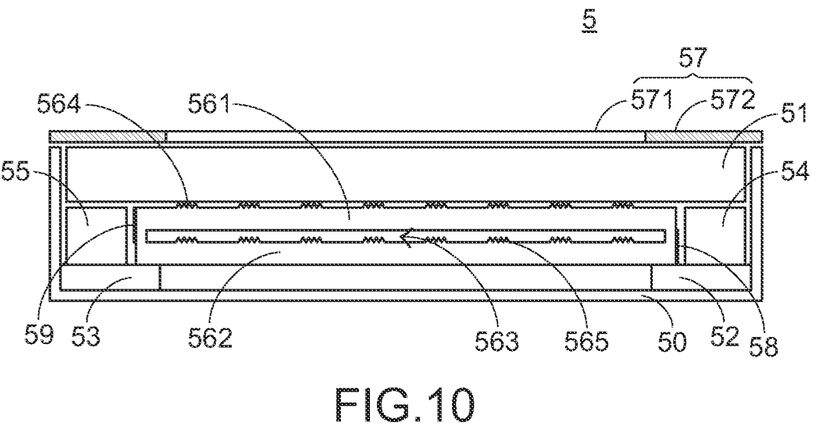
FIG. 10 is a schematic side view illustrating an input device with multiple layers of luminous patterns according to a third embodiment of the present invention.

The present invention further provides a third embodiment. FIG. 10 is a schematic side view illustrating an input device with multiple layers of luminous patterns according to a third embodiment of the present invention.

As shown in FIG. 10, the input device 5 comprises a base plate 50, an input interface 51, a first circuit board 52, a second circuit board 53, a first light-emitting element 54, a second light-emitting element 55, a light guide plate 56, a protective layer 57, a first light-shading structure 58, and a second light-shading structure 59. The light guide plate 56 comprises an upper light-guiding layer 561, a lower light-guiding layer 562, a gap 563, a plurality of first luminous patterns 564, and a plurality of second luminous patterns 565. The gap 563 is arranged between the upper light-guiding layer 561 and the lower light-guiding layer 562, so that the upper light-guiding layer 561 and the lower light-guiding layer 562 are separated from each other by the gap 563. The upper light-guiding layer 561 and the lower light-guiding layer 562 are integrally formed with each other. In addition, the protective layer 57 comprises a light-transmissible zone 571 and a light-shading zone 572.

Except for the following items, the configurations and functions of the input device of the third embodiment are similar to those of the first embodiment, and are not redundantly described herein. In this embodiment, the first circuit board 52 and the second circuit board 53 are disposed on the base plate 50, and located under the input interface 51. The first light-emitting element 54 and the second light-emitting element 55 are disposed on the first circuit board 52 and the second circuit board 53, respectively. The light guide plate 56 is disposed on the first circuit board 52 and the second circuit board 53, and arranged between the first light-emitting element 54 and the second light-emitting element 55. The input interface 51 is disposed over the light guide plate 56. In this embodiment, the input interface 51 is a light-transmissible surface capacitive touch sensor, a light-transmissible inner capacitive touch sensor or a projected capacitive touch sensor. The protective layer 57 is disposed over the input interface 51.

From the above description, the input device of the present invention has a light guide plate with multiple layers of luminous patterns. By means of the single light guide plate, different luminous patterns are selectively visible. Consequently, the overall thickness of the input device is reduced. Moreover, in a case that the circuit board is interposed between the input interface and the light guide plate according to the input device of the present invention, the width of the input device can be further reduced. In other words, the input device of the present invention has reduced thickness and narrowed width.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An input device with multiple layers of luminous patterns, said input device comprising:
    an input interface, wherein a touching signal is generated when said input interface is triggered;
    a first light-emitting element for emitting a first light beam;
    a second light-emitting element for emitting a second light beam; and
    a light guide plate disposed over or under said input interface, and arranged between said first light-emitting element and said second light-emitting element, wherein said light guide plate comprises a plurality of first luminous patterns, a plurality of second luminous patterns and a gap between said first luminous patterns and said second luminous patterns, wherein said first light beam and said second light beam are respectively guided by said light guide plate, so that said first luminous patterns or said second luminous patterns are selectively visible, wherein said light guide plate further comprises an upper light-guiding layer and a lower light-guiding layer, wherein said gap is arranged between said upper light-guiding layer and said lower light-guiding layer, wherein said first luminous patterns are disposed on a first outer surface or a first inner surface of said upper light-guiding layer, and said second luminous patterns are disposed on a second outer surface or a second inner surface of said lower light-guiding layer.

2. The input device according to claim 1 wherein said first light beam is guided by said upper light-guiding layer of said light guide plate and directed to said first luminous patterns, so that said first luminous patterns are shown on said light guide plate, wherein said second light beam is guided by said lower light-guiding layer of said light guide plate and directed to said second luminous patterns, so that said second luminous patterns are shown on said light guide plate, wherein said first luminous patterns and said second luminous patterns are composed of a plurality of closely packed light-guiding microstructures.

3. The input device according to claim 1 further comprising:
    a first light-shading structure disposed on a sidewall of said lower light-guiding layer and located near said first light-emitting element for blocking said first light beam from entering said lower light-guiding layer; and
    a second light-shading structure disposed on a sidewall of said upper light-guiding layer and located near said second light-emitting element for blocking said second light beam from entering said upper light-guiding layer.

4. The input device according to claim 3 wherein said first light-shading structure is a plastic sheet, a sponge structure or a light-shading plate, or said first light-shading structure is formed by painting, spraying, printing or bonding a light-shading material on said sidewall of said lower light-guiding layer, wherein said second light-shading structure is a plastic sheet, a sponge structure or a light-shading plate, or said second light-shading structure is formed by painting, spraying, printing or bonding a light-shading material on said sidewall of said upper light-guiding layer.

5. The input device according to claim 1 further comprising:
    a first circuit board disposed over or under said input interface and located at a first side of said input surface, wherein said first light-emitting element is disposed on said first circuit board; and a second circuit board disposed over or under said input interface and located at a second side of said input surface, wherein said second light-emitting element is disposed on said second circuit board, wherein said first light-emitting element and said second light-emitting element are both side-view light emitting diodes.

6. The input device according to claim 1 wherein said input interface is disposed under said light guide plate, and said input interface is an opaque PCB-based capacitive touch sensor.

7. The input device according to claim 1 wherein said input interface is disposed over said light guide plate, and said input interface is a light-transmissible surface capacitive touch sensor, a light-transmissible inner capacitive touch sensor or a projected capacitive touch sensor.

8. An input device with multiple layers of luminous patterns, said input device comprising:
- an input interface, wherein a touching signal is generated when said input interface is triggered;
- a first light-emitting element for emitting a first light beam;
- a second light-emitting element for emitting a second light beam;
- a light guide plate disposed over or under said input interface, and arranged between said first light-emitting element and said second light-emitting element, wherein said light guide plate comprises a plurality of first luminous patterns, a plurality of second luminous patterns and a gap between said first luminous patterns and said second luminous patterns, wherein said first light beam and said second light beam are respectively guided by said light guide plate, so that said first luminous patterns or said second luminous patterns are selectively visible; and
- a protective layer, which is disposed over said light guide plate for protecting said light guide plate, wherein said protective layer comprises a light-transmissible zone and a light-shading zone, and said light-shading zone is located around said light-transmissible zone for shading said first light beam or said second light beam, wherein in response to said first light beam or said second light beam, said first luminous patterns or said second luminous patterns are visible through said light-transmissible zone, wherein said light-transmissible zone has a preset light-shading percentage, wherein if said first light-emitting element or said second light-emitting element is disabled and said first light beam or said second light beam is not generated, said first luminous patterns or said second luminous pattern are invisible by said first light-emitting element or said second light-emitting element according to said preset light-shading percentage.

9. The input device according to claim 8 wherein if said first light beam or said second light beam is not generated, an external light beam from surroundings of said input device is blocked by said light-shading zone having said preset light-shading percentage, so that said first luminous patterns or said second luminous patterns are invisible, wherein said preset light-shading percentage is in a range between 75% and 80%.

10. The input device according to claim 8 wherein said input interface is disposed under said light guide plate, and said input interface is an opaque PCB-based capacitive touch sensor.

11. The input device according to claim 8 wherein said input interface is disposed over said light guide plate, and said input interface is a light-transmissible surface capacitive touch sensor, a light-transmissible inner capacitive touch sensor or a projected capacitive touch sensor.

12. An input device with multiple layers of luminous patterns, said input device comprising:
- an input interface, wherein a touching signal is generated when said input interface is triggered;
- a first light-emitting element for emitting a first light beam;
- a second light-emitting element for emitting a second light beam;
- a light guide plate disposed over or under said input interface, and arranged between said first light-emitting element and said second light-emitting element, wherein said light guide plate comprises a plurality of first luminous patterns, a plurality of second luminous patterns and a gap between said first luminous patterns and said second luminous patterns, wherein said first light beam and said second light beam are respectively guided by said light guide plate, so that said first luminous patterns or said second luminous patterns are selectively visible;
- a first circuit board disposed over or under said input interface and located at a first side of said input surface, wherein said first light-emitting element is disposed on said first circuit board; and
- a second circuit board disposed over or under said input interface and located at a second side of said input surface, wherein said second light-emitting element is disposed on said second circuit board,
- wherein said first light-emitting element and said second light-emitting element are both side-view light emitting diodes,
- wherein said first light-emitting element is located at a first side of said first circuit board, and a second side of said first circuit board is interposed between said light guide plate and said input interface, wherein said second light-emitting element is located at a first side of said second circuit board, and a second side of said second circuit board is interposed between said light guide plate and said input interface.

13. The input device according to claim 12 wherein said first circuit board comprises a first conductive wire, said first conductive wire is disposed on a top surface of said first circuit board, and said first conductive wire is extended from said second side of said first circuit board to said first side of said first circuit board and connected to said first light-emitting element, wherein said second circuit board comprises a second conductive wire, said second conductive wire is disposed on a top surface of said second circuit board, and said second conductive wire is extended from said second side of said second circuit board to said first side of said second circuit board and connected to said second light-emitting element.

14. The input device according to claim 12 wherein said input interface is disposed under said light guide plate, and said input interface is an opaque PCB-based capacitive touch sensor.

15. The input device according to claim 12 wherein said input interface is disposed over said light guide plate, and said input interface is a light-transmissible surface capacitive touch sensor, a light-transmissible inner capacitive touch sensor or a projected capacitive touch sensor.

* * * * *